United States Patent
Eberlein et al.

(10) Patent No.: US 7,356,217 B2
(45) Date of Patent: Apr. 8, 2008

(54) ADD-DROP DEVICE AND CROSS-CONNECT DEVICE FOR WAVELENGTH MULTIPLEX SIGNALS

(75) Inventors: Jörg Eberlein, Wolfratshausen (DE); Christian Eder, München (DE); Alexander Richter, München (DE); Robert Schimpe, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/547,601

(22) PCT Filed: Feb. 18, 2004

(86) PCT No.: PCT/EP2004/001547

§ 371 (c)(1),
(2), (4) Date: May 24, 2006

(87) PCT Pub. No.: WO2004/082183

PCT Pub. Date: Sep. 23, 2004

(65) Prior Publication Data

US 2007/0160372 A1  Jul. 12, 2007

(30) Foreign Application Priority Data

Mar. 5, 2003 (DE) ............... 103 09 616
Aug. 22, 2003 (DE) ............... 103 38 695

(51) Int. Cl.
*G02B 6/28* (2006.01)
(52) U.S. Cl. .......................... 385/24; 385/15
(58) Field of Classification Search ............ 385/15, 385/24
See application file for complete search history.

(56) References Cited

U.S. PATENT DOCUMENTS

| 5,504,827 | A | 4/1996 | Schimpe |
| 6,268,952 | B1 | 7/2001 | Godil et al. |
| 6,545,783 | B1 * | 4/2003 | Wu et al. .............. 398/83 |
| 6,590,681 | B1 | 7/2003 | Egnell et al. |
| 2002/0101633 | A1 | 8/2002 | Onaka et al. |

FOREIGN PATENT DOCUMENTS

EP  1 030 481 A1  8/2000

(Continued)

OTHER PUBLICATIONS

Michael Vasilyev, Ioannis Tomkos, June-Koo Rhee, Manjusha Mehendale, Bradley S. Hallock, Brian K. Szalabofka, Martin Williams, Sergio Tsuda and Manish Sharma, "Broadcast and Select OADM in 80×10.7 Gb/s Ultra-Longhaul Network", IEEE Photonics Technology Letters, vol. 15, No. 2, Feb. 2003, pp. 332-334, XP002280039.

(Continued)

*Primary Examiner*—Jennifer Doan
(74) *Attorney, Agent, or Firm*—Bell, Boyd & Lloyd LLP (57) ABSTRACT

According to the invention, in add-drop devices of an optical cross-connect device for wavelength multiplex signals, tributary drop signals to be dropped are pre-selected in the drop branch by means of pre-selection elements. Only these signals are amplified, thus reducing the number and/or power of the optical amplifiers. The tributary drop signals are individually selected by means of drop routing elements and adjustable filters. The add branch is created correspondingly.

5 Claims, 5 Drawing Sheets

FOREIGN PATENT DOCUMENTS

| | | |
|---|---|---|
| EP | 1 137 308 A2 | 9/2001 |
| WO | WO 00/57665 | 9/2000 |
| WO | WO 02/087277 A2 | 10/2002 |

OTHER PUBLICATIONS

Eugenio Iannone and Roberto Sabella, "Optical Path Technologies: A Comparison Among Different Cross-Connect Architectures", Journal of Lightwave Technology, vol. 14, No. 10. Oct. 1996, pp. 2184-2196.

* cited by examiner

ADD-DROP DEVICE AND CROSS-CONNECT DEVICE FOR WAVELENGTH MULTIPLEX SIGNALS

CROSS REFERENCE TO RELATED APPLICATIONS

This application is the US National Stage of International Application No. PCT/EP2004/001547, filed Feb. 18, 2004 and claims the benefit thereof. The International Application claims the benefits of German application No. 10309616.7, filed Mar. 5, 2003, and of German application No. 10338695.5, filed Aug. 22, 2003, all three of these applications are incorporated by reference herein in their entirety.

FIELD OF INVENTION

The invention relates to an add-drop device for optical wavelength multiplex signals and to cross-connect devices constructed using a plurality of these devices.

SUMMARY OF THE INVENTION

The transmission of optical signals is carried out today by using wavelength multiplex signals (WDM signals). The purpose of an add-drop device is to branch off (drop) individual signals (channels) of the multiplex signal and to insert (add) new signals in their place.

A plurality of these add-drop devices are combined to form a photonic (functioning purely optically) cross-connector which allows individual signals (channels having one wavelength), referred to here as tributary signals, of a multiplex signal to be dropped and added to a different multiplex signal without it being necessary to perform a prior conversion into electrical signals. In addition, the dropped tributary signals can also be converted into electrical signals and through-connected ("routed") on the electrical level at a lower granularity. Similarly, the use of electrically operating 3R generators is also possible after the opto-electrical conversion. Before addition to one of the optical multiplex signals takes place, an electro-optical conversion is then required again, as also if applicable is a wavelength conversion, but no further details of the latter are to be given here.

The known photonic add-drop devices and cross-connectors use optical splitters, optical combiners, switching matrixes and wavelength-selective elements. The problem particularly with regard to the use of splitters and 1:n switches lies in the reduction of the useful signal level.

As a result, it is even frequently necessary to increase the useful signal level on multiple occasions; the required optical amplifiers make the devices complex and costly, however.

A number of cross-connect architectures are described in "Journal of Lightwave Technologies", Vol. 14, No. 10, October 1996, pp. 2184 to 2196. In a schematic diagram, FIG. 2 of this article shows an optical ring network whose network nodes comprise both photonic cross-connectors and add-drop devices, and also combinations of photonic and digital (electrical) cross-connectors. The digital switching matrixes are intended for routing signals having a lower granularity. The architectures represented in further illustrations comprise optical splitters, adjustable filters, space switch matrixes and optical combiners, supplemented where applicable by wavelength converters. The amplification of the signals is represented schematically by fiber amplifiers which are connected downstream and upstream of the switching matrix.

U.S. Pat. No. 5,504,827 describes an arrangement comprising a wavelength demultiplexer, programmable filters and a wavelength multiplexer, which functions as an optical cross-connector. The arrangement contains discretely constructed wavelength-selective switches which enable routing of the desired signals.

In U.S. Pat. No. 6,268,952 wavelength-selective switches are already used for a simple optical cross-connector.

An add-drop device is known from "IEEE Photonics Technology Letters", Vol. 15, No. 2, February 2003, pp. 332-334, which in a manner known per se extracts a part of a wavelength multiplex signal by way of an optical coupler and selects individual tributary signals by way of adjustable filters. The dropped signals are suppressed by means of an adjustable filter device in the through path. The extracted partial signal (and if applicable also the through-connected signal) are routed by way of an amplifier. In the add branch, apart from the obligatory amplifier, a noise filter is provided which ensures that the through-connected signals are not adversely affected unnecessarily by the amplifier noise.

Figure 1:
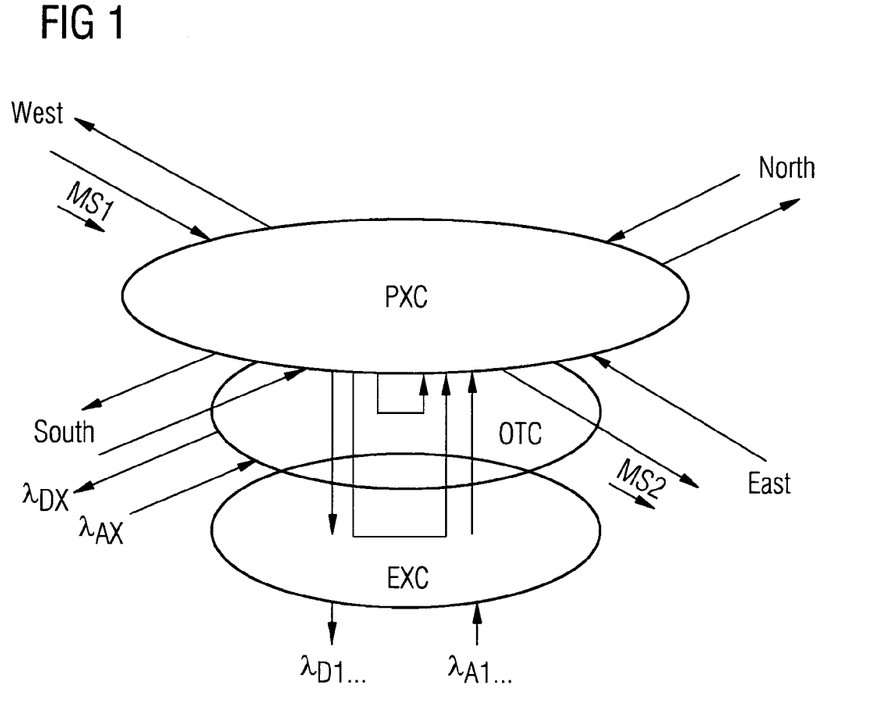
FIG. 1 shows an exemplary simplified illustration of the principle of a cross-connect device.

FIG. 1 gives a simplified illustration of the principle of a cross-connect device described above. The cross-connect device can be subdivided into different layers. One layer, the photonic cross-connector PXC, interconnects only optical (photonic) signals. This layer receives and sends wavelength multiplex signals and is able, by way of a further layer referred to here as Optical Tributary Connection OTC, to drop or add tributary signals (channels) of a particular wavelength. These tributary signals $\lambda_{DX}$, $\lambda_{AX}$ can also be fed directly in optical form by way of the optical tributary connection to the photonic cross-connector PXC or can be output by the latter. What is essential, however, is the optical tributary connection interface function between the photonic cross-connector PXC and an electrical cross-connector EXC which can output and receive the tributary signals in electrical form and can subdivide each tributary signal into a plurality of partial signals of a lower granularity and route them as digital signals. FIG. 1 thus represents a universally applicable cross-connect device.

The object of the invention is to specify an add-drop device which makes it possible with a modest level of complexity to route, drop and add both optical signals on the photonic level. The object is also to specify a cross-connect device which is capable of routing both tributary signals photonically and also digital electrical signals having a lower granularity at a reduced level of complexity.

This object is achieved by the claims.

The decisive advantage of the add-drop device is the fact that the majority of the tributary signals are routed by way of the through path and that only those signals which undergo a special form of handling are routed by way of the drop-add path, for example are dropped or added, are regenerated or need to be converted in respect of their wavelength.

The add-drop device supplements the optical routing facilities with a drop-add path over which a small portion of the tributary signals is routed.

Also particularly advantageous is the preselection of drop signals which then need to be amplified only in the drop branch. With regard to previous add-drop devices on the other hand, the received wavelength multiplex signals were initially divided up into a large number of signals by means of optical splitters, which then all needed to be amplified before a selection of individual signals (individual wavelengths) took place.

An extension of the add-drop device can be achieved without problems by means of optical splitters and combiners inserted into the through path and into the add-drop path.

An optical cross-connector constructed using these add-drop devices enables the photonic interconnection of optical tributary signals. In this situation, the number and performance of the optical amplifiers is minimized. After the selection of tributary signals has taken place, they are either through-connected or converted into electrical signals which can be switched at a lower granularity by way of an electrical switching matrix or can also be fed to an electrical 3R regeneration process.

An adjustable add filter provided in the add branch ensures adequate freedom from noise in the free channels of the add branch which are combined with the channels transmitted by way of the through path to form a new multiplex signal.

With regard to the construction elements available today, it is still currently advantageous not to select all the drop channels by using a single optical filter but to implement corresponding routing elements by means of a series connection of power splitters and wavelength selective elements and optical switches.

From the point of view of complexity, it is also advantageous not to provide all possible through-connection variants but to use simpler structures, depending on what is required. Thus, for example, certain tributary signals of the drop branch and/or of the add branch do not need a free through-connection capability.

The invention will be described in detail with reference to embodiments.

DETAILED DESCRIPTION OF INVENTION

Figure 2:
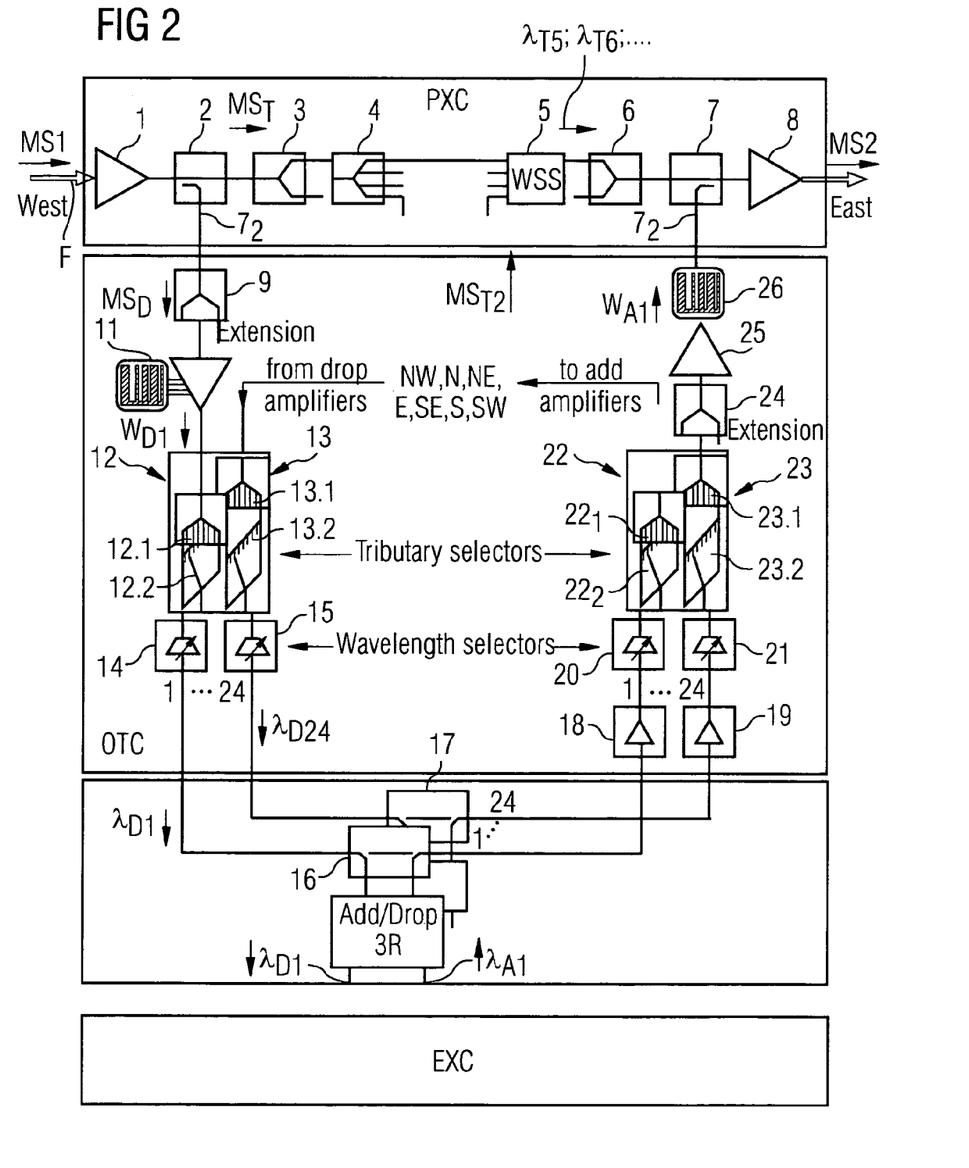
FIG. 2 shows a schematic diagram of an add-drop device.

FIG. 2 shows one of a plurality of add-drop devices of an optical cross-connector.

A first wavelength multiplex signal MS1 is received by way of a fiber F of a WEST-EAST link and fed to an input of the add-drop device 1, 2, 3, 4, 5, 6, 7, 8, 9, 10, 11, 12, 13, 14, 15, 16, 17, 18, 19, 20, 21, 22, 23, 24, 25, 26. This contains an optical amplifier 1, and a first splitter 2 which divides the wavelength multiplex signal MS1 into two partial signals, a multiplex through signal MST and a multiplex drop signal MSD which are routed to a through path and to an add-drop path respectively.

The through path (optical express layer) implements the optical cross-connector PXC. It comprises a series circuit consisting of a second splitter 3, a signal branching facility 4 (preferably a power splitter), a signal combiner 5 (preferably an adjustable filter element (WSS) having a plurality of inputs) and a first combiner 6. The through path and the add-drop path are combined by a second combiner 7, downstream of which is connected an optical amplifier 8. The splitters and combiners connected in series can also be replaced by other configurations depending on the desired function and the intended expandability.

By way of a first output from the first splitter 2, the multiplex through signal MST is routed to the through path and the tributary drop signals $\lambda_{D1}, \lambda_{D2}, \ldots$ (channels) which are to be dropped are blocked by the adjustable filter element 5, which can be implemented as a wavelength selective switch (WSS) 5 or wavelength blocker, or only the desired tributary through signals $\lambda_{T1}, \lambda_{T2}, \ldots$ are through-connected. The illustration shows only the through path of a single add-drop device. A plurality of these add-drop devices function in an already known manner as an optical cross-connector. The multiplex through signal MST is divided into a plurality of signals by the multiple splitter which are then each routed to one input of a wavelength selective switch (corresponding to 5). Corresponding multiplex signals MST2 are routed to the further inputs of the wavelength selective switch 5 of the illustrated add-drop device.

One part of the complete multiplex signal MS1 received is dropped as a multiplex drop signal $MS_D$ at a second output $2_2$, the first splitter 2 for the drop branch. The latter and in each case one add branch of each add-drop device together form the drop-add path. The multiplex drop signal $MS_D$ is here fed by way of an upgrade splitter 9 to a controllable frequency-selective drop amplifier 10, 11 (for example, a series circuit comprising a programmable filter and an amplifier). This amplifies only the tributary drop signals $\lambda_{D1}, \lambda_{D2}, \ldots$ (channels) which are dropped. The output signal from the amplifier 10, referred to as the first WDM drop signal $W_{D1} = \lambda_{D1}, \lambda_{D2}, \ldots$, is fed to a first splitter switching device 12. A plurality of these, 24 for example, are present in a cross-connect device, of which however apart from the first also the twenty-fourth splitter switching device 13 is illustrated here, to which a further WDM drop signal $W_{DM}$ is fed from another add-drop device or link NW, N, NE, SE, S or SW.

In each splitter switching device 12, 13, ... WDM drop signals $W_{D1}, W_{D2}, \ldots W_{DM}$ are branched by means of multiple splitters $12_1, 13_1, \ldots$ to a plurality of outputs. In the example illustrated the optical switches $12_1, 13_2$ (a switching matrix) connected downstream in each case select the WDM drop signals $W_{D1}, W_{D2}, \ldots$ from the large number of WDM drop signals and feed them to the filters 14, 15, .... The splitter switching devices 12, 13 thus operate as drop routing elements for the WDM drop signals. The filters 14, 15 subsequently each select individual tributary drop signals $\lambda_{D1}, \ldots \lambda_{D24}$. These can then in each case be routed by way of an add-drop-continue module 16, 17 and through-connected or output (or fed to an add-drop module if no through-connection is to be performed). With regard to a through-connection, a selected tributary drop signal $\lambda_{D1}$ is fed as a tributary add signal $\lambda_{A1}$ to a further add-drop device 28. The corresponding process occurs with selected tributary drop signals $\lambda_{D24}$ which come from other add-drop devices 27 and are added to a WDM add signal $W_{A1}$ of the illustrated add-drop device.

The drop signals can also be fed by way of the add-drop-continue modules 16, 17 to amplifiers, 3R regenerators or after opto-electrical conversion to the digital cross-connector EXC.

The add branch is constructed in a manner corresponding to the drop part. First of all the tributary drop signals $\lambda_{A1}, \ldots \lambda_{A24}$ to be added, particularly following an electro-optical conversion, are amplified by optical amplifiers 18, 19, .... The amplifier noise is suppressed by means of adjustable filters 20, 21 before the tributary add signals $\lambda_{A1}, \ldots \lambda_{A24}$ are combined by way of combiner switching devices 22, 23. The combiner switching devices, which are constructed in a manner corresponding to the splitter switching devices 12, 13, . . . and function as add-routing elements, comprise optical switches 22₁, 23₁ and multiple combiners 22₂, 23₂ in a manner corresponding to the drop branch.

The add signals $\lambda_{A24}$, . . . combined to form a WDM add signal $W_{A1}$ are fed by way of an upgrade combiner 24, a frequency-selective add amplifier 25, 26 and a second combiner 7 and added to the through-connected through signals $\lambda_{T5}, \lambda_{T5}$ . . . . All tributary signals output are amplified again in an optical amplifier 8.

The adjustable frequency-selective add amplifier 25, 26 or a controllable filter 26 which allows only the add signals to pass through is used in the add branch in particular for suppressing the amplifier noise and additionally prevents any collision of the added tributary add signals $\lambda_{A24}, \ldots$ with the through-connected tributary through signals $\lambda_{T5}$, $\lambda_{T6}$ . . . in the event of a malfunction.

As already described, further tributary drop signals are generally fed by further add-drop devices 27 (links) which are not shown to the further splitter switching devices 13. Correspondingly, in the add branch further tributary add signals are fed by the combiner switching devices 23, . . . to further add-drop devices 28 which are not shown. The associated links are denoted here by the compass directions NW, N, NE, SE, S, SW. A photonic cross-connector PXC represents a corresponding device.

In order to extend the add-drop device or the cross-connect device the upgrade splitter 9 or the upgrade combiner 24 are provided, as also are the splitter 3 and the combiner 6.

The link with an electrical cross-connector EXC is effected by way of the add-drop-continue modules 16, 17. After an opto-electrical conversion of the tributary signals, SDH signals for example, the electrical cross-connector EXC can divide these signals into signals of any desired granularity and through-connect them at this granularity. The combination of photonic and electrical cross-connector results in a cross-connect device having a wide range of application at a low cost.

Figure 3:
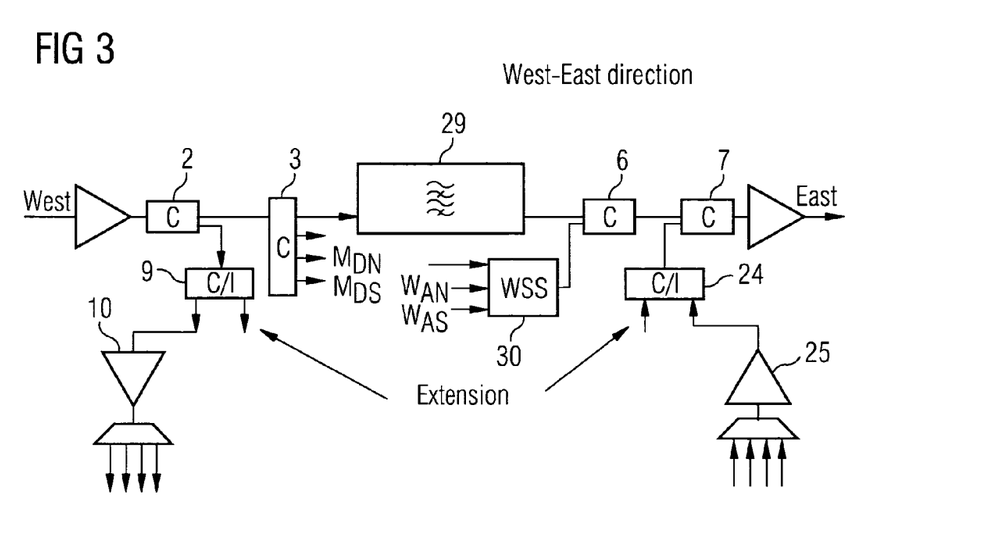
FIG. 3 shows an advantageous possible extension of the add-drop device.

FIG. 3 shows an extension option for the add-drop device. In a first configuration level, a wavelength blocker (WB) 29 which blocks the signals to be dropped is incorporated in the through branch. If the add-drop device is to be extended, in other words if more individual signals are now to be dropped in order to be added to further multiplex signals, then the branching takes place here by way of the splitter 3 located in the through branch. The tributary signals selected from the multiplex partial signals $MS_{DN}$ and $MS_{DS}$ (the drop branch is not shown in FIG. 3) are now to be sent in the north and south direction. Corresponding WDM add signals $W_{AN}$ and $W_{AS}$ are routed for example by way of a wavelength-selective switch 30—or by way of further wavelength blockers which are not shown—and combined in the combiner 6 with the tributary signals routed by way of the through path.

Additional extensions to the add-drop device, in particular to the signals routed by way of the drop-add path, are also possible by way of the upgrade splitter 9 and the upgrade combiner 24. An add-drop device can thus be successively extended to form a powerful cross-connector.

A preselection of the drop signals, which is however fixed, can actually also be performed by an interleaver "I" as element 9. The arrangement comprising couplers 2, 3, interleaver 9 and wavelength blocker 29 can also be replaced by a wavelength-selective switch.

Figure 4:
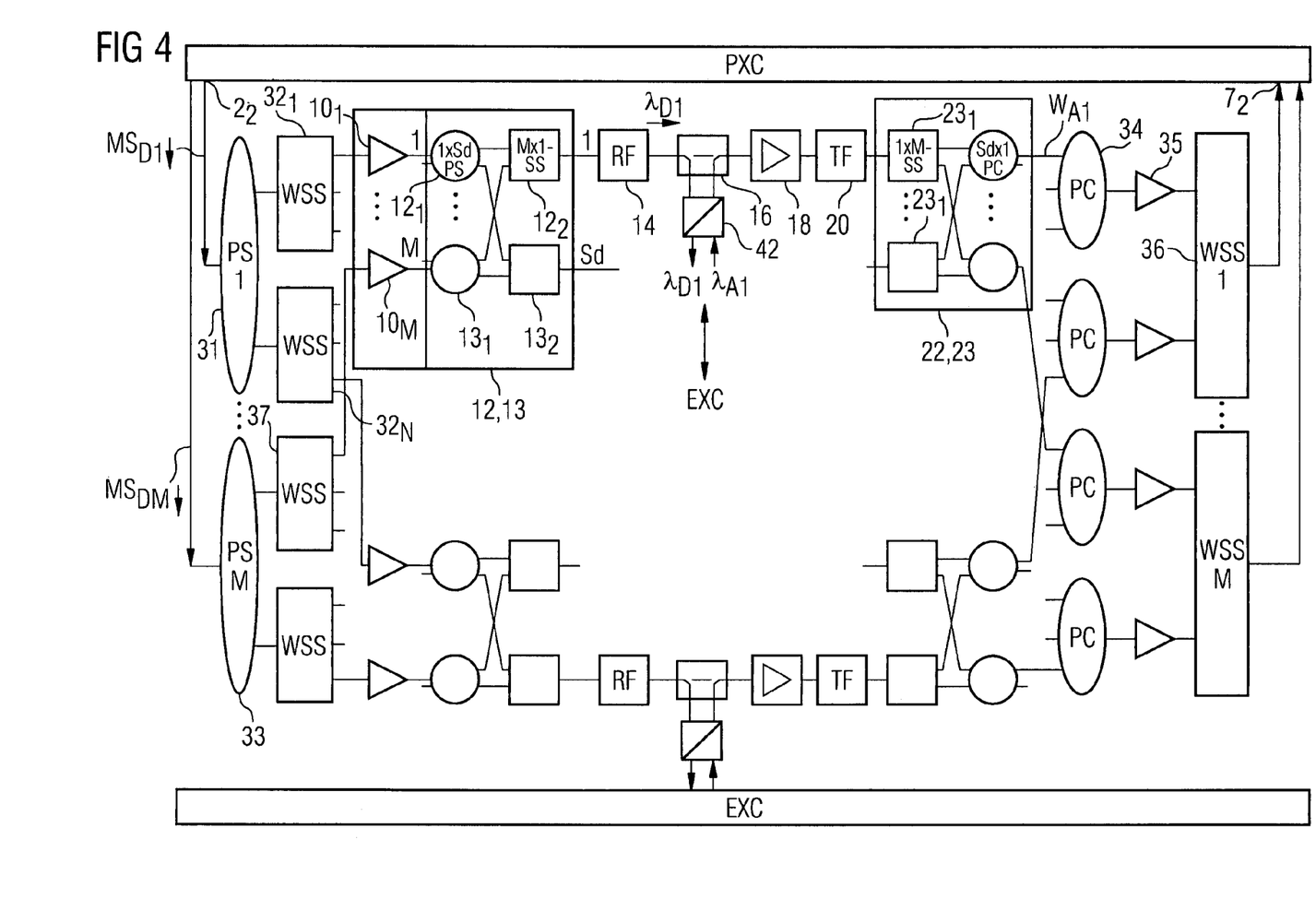
FIG. 4 shows a first embodiment of the add-drop path.

FIG. 4 shows a more specific embodiment of the invention. In order to facilitate comprehension of the function of the arrangement, abbreviations have been entered for components in addition to the reference characters, as follows:

WSS—wavelength-selective switch, PS—power splitter, PC—power combiner, RF—drop filter and TF—add filter. The figure shows only two of a plurality of possible drop-add paths, in each case from a second output 2₂ of the splitter 2 up to the second input 7₂ of the combiner 7 or between corresponding terminals of the other add-drop devices. Further drop-add paths constructed in the same manner are indicated only by dots. The first multiplex drop signal $MS_{D1}$ is initially divided into a plurality of further identical multiplex partial signals by way of a splitter 31 and then fed to wavelength-selective switches 32₁ to 32ₙ which select one or more tributary signals in each case, here the tributary drop signals $\lambda_{D1}, \lambda_{D2}$ to be dropped. An output signal from the wavelength-selective switch 32₁, the WDM drop signal $W_{D1}$, is fed to the upper drop branch whereas the WDM drop signal $W_{DM}$ preselected by the wavelength-selective switch 32ₙ is fed to the lowest drop branch. The other, unlabeled outputs from the wavelength-selective switches 32₁ to 32ₙ serve to extend the switching matrix or are fed to the drop branches of other add-drop devices (for other links). Further WDM drop signals are thus fed to the upper drop branch, for example from the wavelength-selective switch 37; this is illustrated for the WDM drop signal $W_{DM}$. The combination of splitters and wavelength-selective switches is always used for preselection of the tributary drop signals.

The WDM drop signals $W_{D1}$ are amplified in optical amplifiers 10₁, . . . , 10ₘ and then divided up again in each case by way of a further splitter 12₁, . . . , 13₁. This division into Sd partial signals takes place according to the switching capacity and the required signal level. The outputs from these splitters are in each case connected to an input of M:1 switches 12₂ to 13₂. According to FIG. 2, only two of the (space) switches of the upper drop branch are illustrated. The arrangement corresponds again to a drop routing element.

An adjustable filter 14 is connected downstream in each case to the outputs of the M:1 switches 12₂ to 13₂ which means that the individual selection of a tributary drop signal is possible (further wavelength-selective switches represent an alternative to the combination of switches 12₂ and 13₂ and filters 14, . . . ). This arrangement of the splitters and wavelength-selective switches and also of the filters thus corresponds again to the series circuit comprising a wavelength routing element and a selection device.

As described briefly above, if the corresponding switching flexibility is desired, a WDM drop signal is fed in each case by further add-drop devices, the lower one in this case, from the output of an associated wavelength-selective switch 37 by way of an amplifier 10ₘ to the splitters 10ₘ, . . . of the drop branch just described. This arrangement thus corresponds functionally to the simpler embodiment in accordance with FIG. 2.

Each selected tributary signal $\lambda_{D1}$, . . . can be optically amplified by way of add-drop-continue modules 16 or, following conversion into an electrical signal of a 3R regeneration, be fed to an add branch of another add-drop device. Similarly, the tributary signal can only be regenerated and added again. After conversion into electrical form by the opto-electronic converter 42, it can be fed to the electrical cross-connector EXC, thereby enabling the routing of signals at a lower granularity.

The add branch is constructed in a manner largely corresponding to the drop branch, whereby the position of the add filter corresponds to that in FIG. 2. Initially, optical tributary add signals $\lambda_{A1}$ to be added are amplified in an optical amplifier 18 and the noise constituents outside the spectrum of the tributary add signal are then reduced by means of a filter 20. In order to enable this tributary add signal $\lambda_{A1}$ to be added to different multiplex signals, it can be routed by using a 1:M space switch $22_1$ to different outputs which are in turn connected to different combiners $22_2$ to $23_2$. The outputs from the combiners $22_2$ to $23_2$, at which a plurality of tributary add signals are issued or a WDM add signal is issued, are again connected to inputs of further combiners 34, . . . . The [lacuna] are here fed by way of an optical amplifier 35 to a wavelength-selective switch 36 and combined with other WDM add signals. The wavelength-selective switch 36 is used again for filtering out undesired noise spectra. Whether a plurality of individual amplifiers 35, . . . are required or whether a common optical amplifier, which is followed by only one wavelength-selective switch wavelength blocker, is sufficient after the combination of signals depends on the size of the photonic cross-connector PXC and its dimensioning. The wavelength-selective switch can be replaced by a controllable filter, a wavelength blocker according to FIG. 2.

Depending on the construction elements present, splitters and wavelength-selective switches or combiners and wavelength-selective switches can also be combined.

Figure 5:
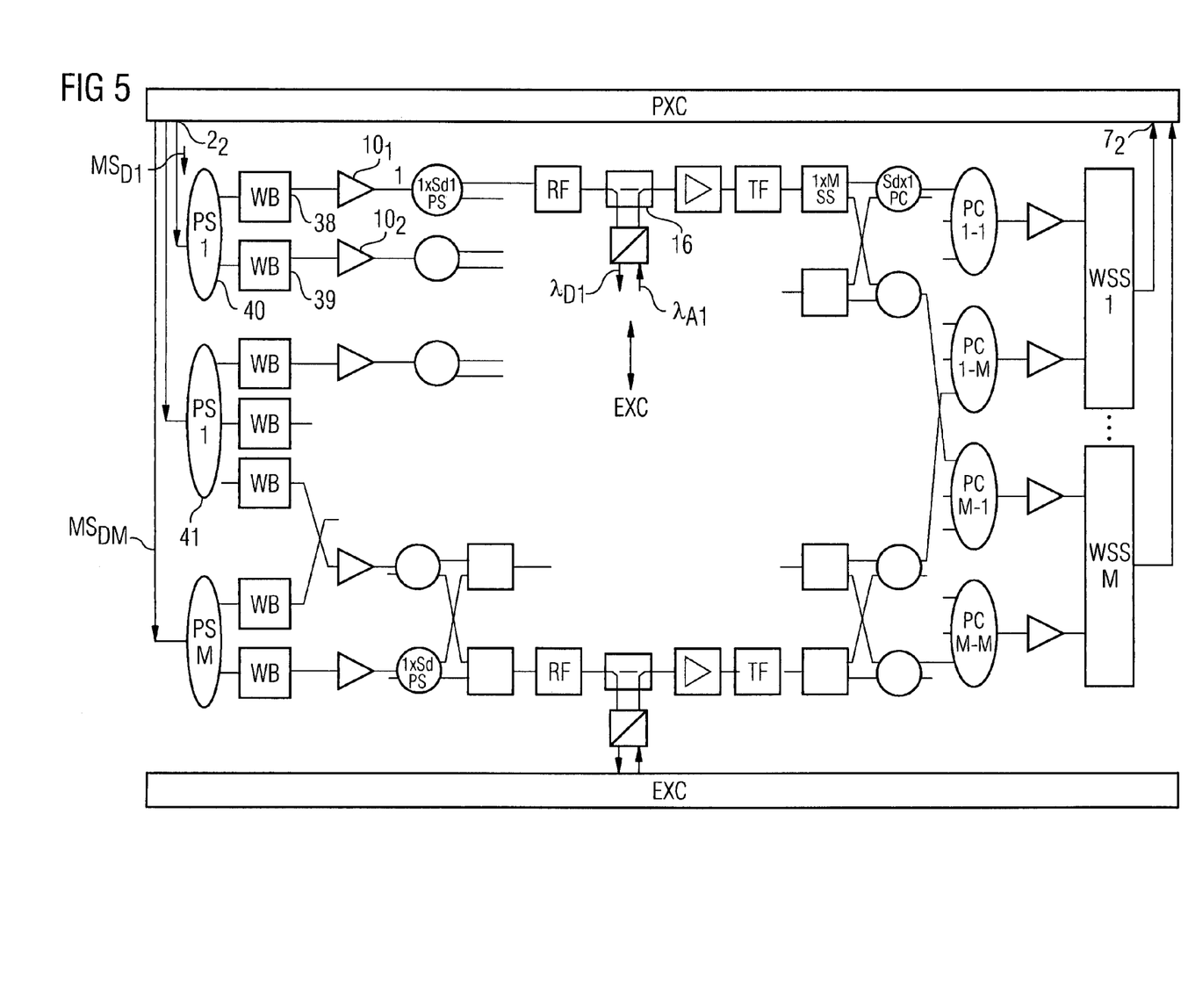
FIG. 5 shows a simplified embodiment of the add-drop path.

FIG. 5 shows a partially simplified embodiment of the drop branches of an add-drop device. A splitter 40 having a plurality of outputs, to which the wavelength blockers (WB) 38 and 39 are attached, functions here as a wavelength routing element which makes it possible to drop certain WDM drop signals which are routed by way of the amplifier $10_1$ and the splitter $12_1$. A filter, which in each case enables the selection of a tributary drop signal, is connected to each of the outputs of the splitter $12_1$. The tributary drop signals can in turn be fed by way of the add-drop-continue module 16 to the electrical switching matrix or to a regenerator. The add branch can be implemented to be symmetrical to the drop branch or as previously. A following drop branch, which receives a multiplex partial signal $MS_{D2}$ from a splitter $2_{22}$, splits this up in a splitter 41 into three partial signals, from which further WDM drop signals are selected by wavelength blockers. Two WDM drop signals are routed as described in the first add-drop path, while the third WDM drop signal, as described under FIG. 4, is fed to the drop branch of a further add-drop device and can be routed together with the WDM drop signal $WD_M$ obtained from WDM partial signal $MS_{DM}$. Any desired hybrid forms are possible here.

The invention claimed is:

1. A cross-connect device for routing optical and electrical signals comprising:
   a photonic cross-connector;
   an electrical cross-connector, wherein
   the photonic cross-connector contains a plurality of add-drop devices adapted to be fed with an optical wavelength multiplex signal, each add-drop device comprising:
   a through-path comprising at least one adjustable wavelength selective element, which allows only tributary through-signals to pass;
   a drop branch adapted to be fed with a dropped multiplex drop signal and which contains further wavelength-selective elements for the selection of tributary drop signals; and
   an add branch adapted to add tributary add signals and to combine the tributary add signals with tributary through-signals routed by way of the through-path to form a multiplex signal; wherein
   the through-path comprises a signal branching facility configured to feed through-signals to further add-drop devices and a signal combiner configured to receive through-signals from further add-drop devices and to combine the received through-signals with the tributary through-signals routed by way of the through-path; wherein
   at least one adjustable wavelength-selective element for the preselection of a wavelength multiplex (WDM) drop signal composed of tributary drop signals is arranged in the drop branch; wherein
   drop routing elements for routing the tributary drop signals are arranged downstream of the further wavelength-selective elements; wherein
   adjustable filter elements for performing an individual selection of the tributary drop signals are arranged downstream of the drop routing elements; wherein
   add routing elements for routing tributary add signals are arranged in the add branch, and wherein the add routing elements are adapted to combine the tributary add signals to form a wavelength multiplex (WDM) add signal; and wherein
   the add-drop devices are operatively coupled via the signal branching facilities and the signal combiners thereof.

2. The cross-connector device according to claim 1, wherein
   a first preselection element to whose input a first multiplex drop signal is fed and at whose outputs WDM drop signals containing preselected tributary drop signals are issued is located in the drop branch of an add-drop device, wherein
   an optical amplifier is connected to each of the outputs of the preselection element, wherein
   inputs of the drop routing elements are connected in each case by way of the amplifiers to an output of preselection elements of further add-drop devices, whereby a drop routing element comprises a plurality of 1:Sd splitters and a plurality of optical M:1 switches connected to the outputs of the drop routing element, and whereby a further WDM drop signal is fed at least from one other wavelength multiplex signal, wherein
   an adjustable filter is connected in each case to an output of the optical M:1 switches for the selection of a tributary drop signal in each case, wherein
   a selected tributary drop signal is routed by way of an add-drop-continue module or is routed to the electrical cross-connector, wherein
   in the add branch the tributary add signals are fed to a 1:M switch, and wherein
   outputs of a plurality of 1:M switches are connected to inputs of combiners which combine the tributary add signals to form a WDM add signal.

3. The cross-connector device according to claim 1, wherein
   a first multiplex drop signal which divides the multiplex drop signal into a plurality of different WDM drop signals containing tributary drop signals is fed to a preselection element in the drop branch, wherein
   amplifiers are connected to the outputs of the preselection element, wherein
   a splitter is connected as a routing element in each case to outputs of the amplifiers, and wherein
   adjustable filters are connected to the outputs of the splitters for an individual selection of tributary drop signals, whose outputs are connected in each case to one of the add-drop-continue modules.

4. A cross-connector for optical signals, comprising:
a plurality of add-drop devices operatively coupled via signal branching facilities and signal combiners of the add-drop devices; wherein
each of at least some of the add-drop devices is adapted to be fed with an optical wavelength multiplex signal, and comprises:
a through-path comprising at least one adjustable wavelength selective element, which allows only tributary through-signals to pass;
a drop branch adapted to be fed with a dropped multiplex drop signal and which contains further wavelength-selective elements for the selection of tributary drop signals; and
an add branch adapted to add tributary add signals and to combine the tributary add signals with tributary through-signals routed by way of the through-path to form a multiplex signal; wherein
the through-path comprises a signal branching facility configured to feed through-signals to further add-drop devices and a signal combiner configured to receive through-signals from further add-drop devices and to combine the received through-signals with the tributary through-signals routed by way of the through-path; wherein
at least one adjustable wavelength-selective element for the preselection of a wavelength multiplex (WDM) drop signal composed of tributary drop signals is arranged in the drop branch; wherein
drop routing elements for routing the tributary drop signals are arranged downstream of the further wavelength-selective elements; wherein
adjustable filter elements for performing an individual selection of the tributary drop signals are arranged downstream of the drop routing elements; wherein
add routing elements for routing tributary add signals are arranged in the add branch, and wherein the add routing elements are adapted to combine the tributary add signals to from a wavelength multiplex (WDM) add signal; wherein
a first preselection element to whose input a first multiplex drop signal is fed and at whose outputs WDM drop signals containing preselected tributary drop signals are issued is located in the drop branch of an add-drop device; wherein
an optical amplifier is connected to each of the outputs of the preselection element; wherein
inputs of the drop routing elements are connected in each case by way of the amplifiers to an output of preselection elements of further add-drop devices, whereby a drop routing element comprises a plurality of 1:Sd splitters and a plurality of optical M:1 switches connected to the outputs of the drop routing element, and whereby a further WDM drop signal is fed at least from one other wavelength multiplex signal; wherein
an adjustable filter is connected in each case to an output of the optical M:1 switches for the selection of a tributary drop signal in each case; wherein
a selected tributary drop signal is routed by way of an add-drop-continue module or is routed to an electrical cross-connector; wherein
in the add branch the tributary add signals are fed to a 1:M switch, and wherein
outputs of a plurality of 1:M switches are connected to inputs of combiners which combine the tributary add signals to form a WDM add signal.

5. A cross-connector for optical signals, comprising:
a plurality of add-drop devices operatively coupled via signal branching facilities and signal combiners of the add-drop devices; wherein
each of at least some of the add-drop devices is adapted to be fed with an optical wavelength multiplex signal, and comprises:
a through-path comprising at least one adjustable wavelength selective element, which allows only tributary through-signals to pass;
a drop branch adapted to be fed with a dropped multiplex drop signal and which contains further wavelength-selective elements for the selection of tributary drop signals; and
an add branch adapted to add tributary add signals and to combine the tributary add signals with tributary through-signals routed by way of the through-path to form a multiplex signal; wherein
the through-path comprises the signal branching facility configured to feed through-signals to further add-drop devices, and the signal combiner configured to receive through-signals from further add-drop devices and to combine the received through-signals with the tributary through-signals routed by way of the through-path; wherein
at least one adjustable wavelength-selective element for the preselection of a wavelength multiplex (WDM) drop signal composed of tributary drop signals is arranged in the drop branch; wherein
drop routing elements for routing the tributary drop signals are arranged downstream of the wavelength-selective element; wherein
adjustable filter elements for performing an individual selection of the tributary drop signals are arranged downstream of the drop routing elements; wherein
add routing elements for routing tributary add signals are arranged in the add branch, and wherein the add routing elements are adapted to combine the tributary add signals to form a wavelength multiplex (WDM) add signal; wherein
a first multiplex drop signal which divides the multiplex drop signal into a plurality of different WDM drop signals containing tributary drop signals is fed to a preselection element in the drop branch; wherein
amplifiers are connected to the outputs of the preselection element; wherein
a splitter is connected as a routing element in each case to outputs of the amplifiers, and wherein
adjustable filters are connected to the outputs of the splitters for an individual selection of tributary drop signals, whose outputs are connected in each case to one of the add-drop-continue modules.

* * * * *